United States Patent [19]

Reinhard

[11] 4,254,423

[45] Mar. 3, 1981

[54] TELESCOPIC EQUIPMENT CARRIER INCLUDING ANTENNAS

[75] Inventor: Gerhard Reinhard, Bremen, Fed. Rep. of Germany

[73] Assignee: Vereinigte Flugtechnische Werke-Fokker GmbH, Bremen, Fed. Rep. of Germany

[21] Appl. No.: 948,092

[22] Filed: Oct. 2, 1978

[30] Foreign Application Priority Data

Oct. 1, 1977 [DE] Fed. Rep. of Germany ....... 2744293

[51] Int. Cl.³ .................................... H01Q 1/10
[52] U.S. Cl. .................................... 343/883; 343/902; 52/118
[58] Field of Search ............... 52/114, 115, 118, 123; 343/883, 901, 902

[56] References Cited

U.S. PATENT DOCUMENTS

| 2,708,493 | 5/1955 | Badertscher et al. ............... 52/115 |
| 3,688,455 | 9/1972 | Zebuhr ................................. 343/883 |
| 4,137,535 | 1/1979 | Rupprecht ......................... 343/902 |

FOREIGN PATENT DOCUMENTS

| 466824 | 5/1914 | France ............................... 52/115 |
| 251028 | 2/1970 | U.S.S.R. ........................... 343/883 |

*Primary Examiner*—Eli Lieberman
*Attorney, Agent, or Firm*—Smyth, Pavitt, Siegemund, Jones & Martella

[57] ABSTRACT

An antenna mast is constructed from telescoped tubes which are extended for deployment by hydraulic or pneumatic pressure, the tubes when extended, are latched to each other internally, permitting depressurization. A set of unlatch cones becomes sequentially effective to unlatch the latches, beginning from the top to stepwise telescope the tubes into each other. Spring biased latches are mounted on an insert in the bottom of tubes; the unlatch cones, except the highest ones, extend from the bottom of the inserts.

6 Claims, 2 Drawing Figures

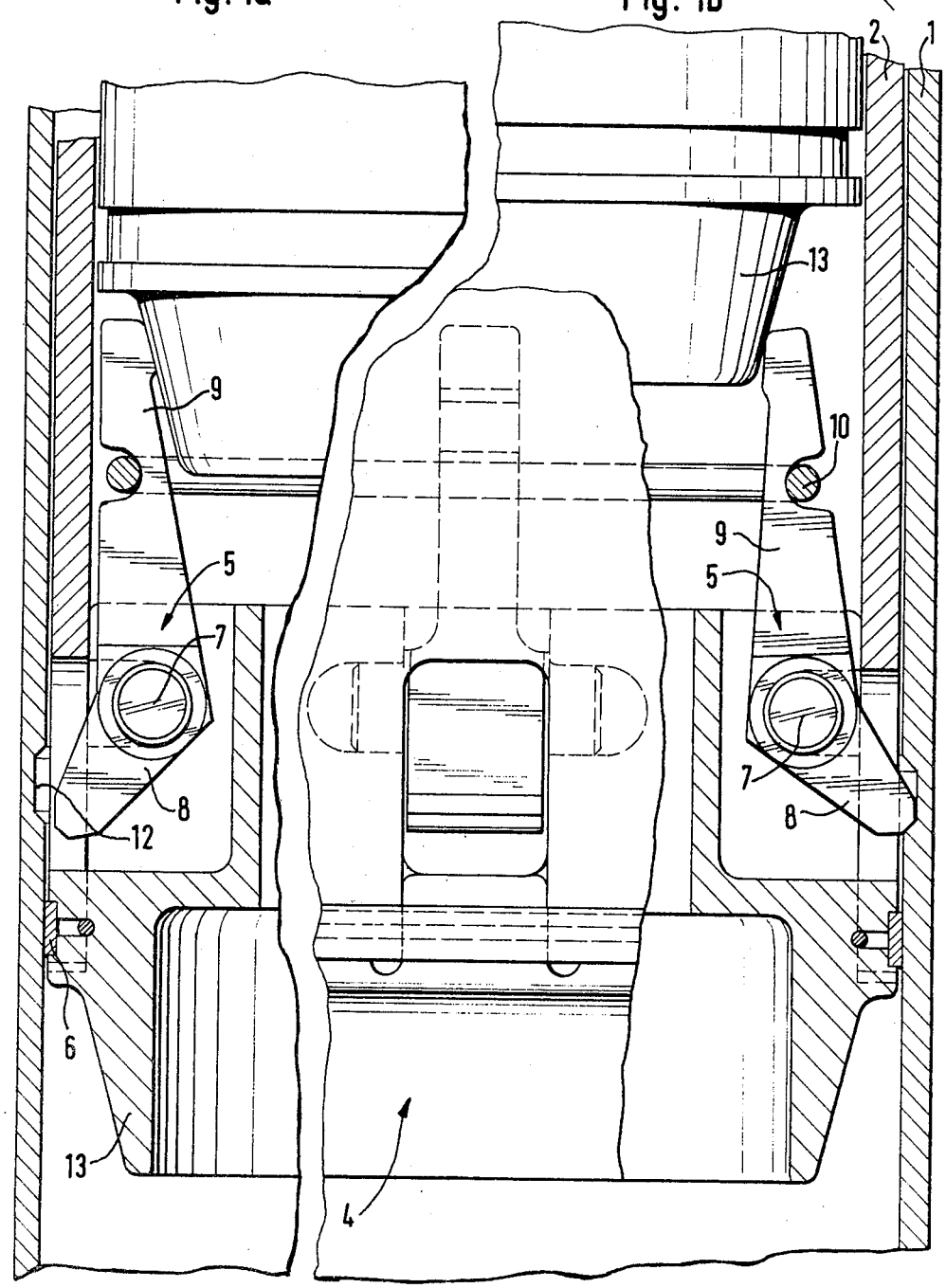

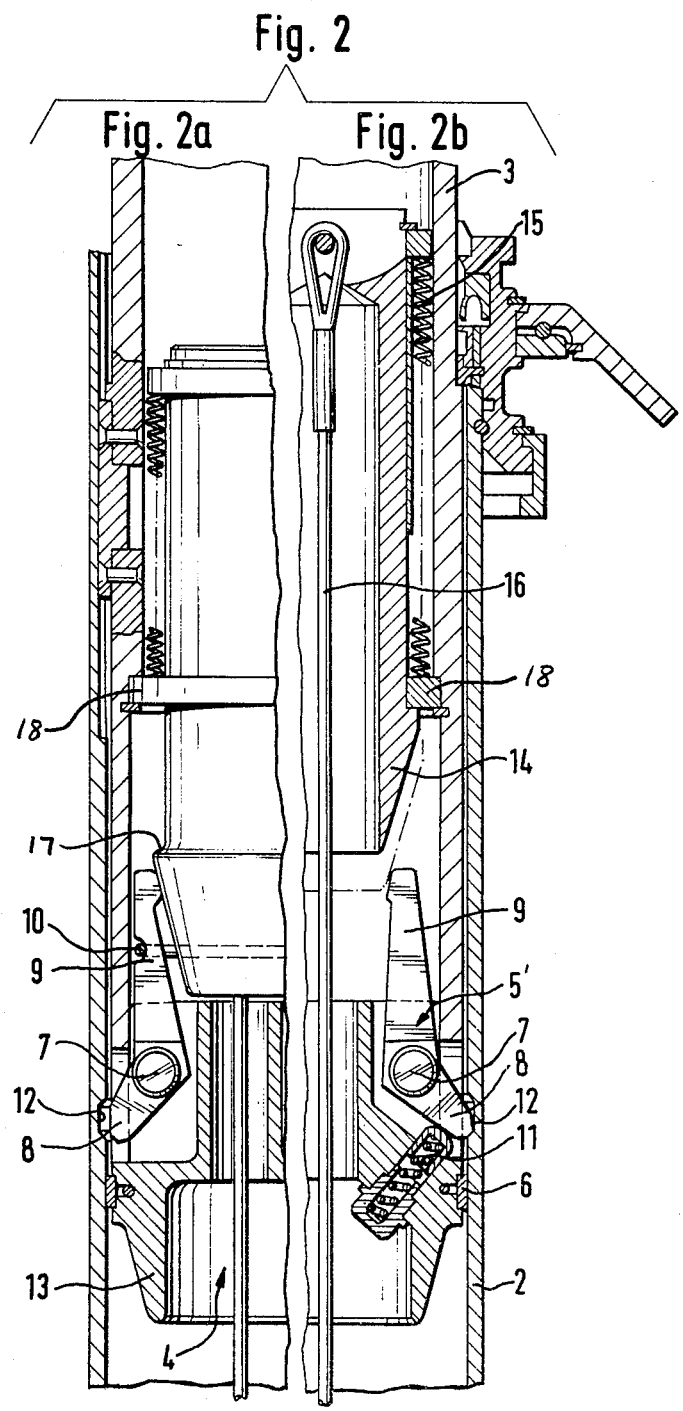

TELESCOPIC EQUIPMENT CARRIER INCLUDING ANTENNAS

BACKGROUND OF THE INVENTION

The present invention relates to a telescoped equipment carrier which, for example, can be adjusted as to elevation and locked in the projected disposition, and more particularly, the invention relates to an antenna structure which can be hydraulically or pneumatically operated for its extension.

Hydraulically operated antenna masts are known generally. They are used mostly in mobile equipment for each set up or even placement in locations which are to be varied. The known systems have indeed the advantage that they can be positioned and set up quite rapidly; still, they are not well suited, for example, for setting up a radio link. For example, temperature variations do, in fact, change the height of the mast quite considerably. A temperature variation of 20° centigrades and more is not unusual. If the deployment height is about 20 m (65'), such temperature change may produce a significant change in height and the change does, in fact, render the radio link inoperative. Also, hydraulic actuation carries with it always some leakage problem so that one has to add some liquid from time to time, particularly to keep constant the adjusted protraction height. For exactly that reason, mobile military antenna masts use mechanical devices which can be erected and folded up again or are cranked up etc., in spite of other drawbacks these devices have, namely construction which is cumbersome to work with.

DESCRIPTION OF THE INVENTION

It is an object of the present invention to provide a new and improved telescopic equipment carrier, particularly for vertical erection.

It is a particular object of the present invention to provide a new and improved arrangement of telescopic tubes which are easily telescoped but do not have the drawbacks outlined above, i.e. do not depend on stabile temperature conditions for maintaining a particular height and do not require complicated mechanical structure that has to be manipulated.

It is a specific object of the present invention to improve a telescopic tube assembly, serving as equipment carrier which are extended and deployed by pressurizing the interior of that assembly.

In accordance with the preferred embodiment of the invention, it is suggested to include in each of the tubes, except the lowest one, a bottom insert which is provided with at least one, preferably more than one latches, constructed, for example, as spring biased angle levers whose one arm latches into a recess in the upper portion of the respective tube below, and whose other arm is actuated by unlatch means upon collaps from the deployed or extended position. The unlatch means include, e.g. a cone which, except for the one needed to unlatch the latch or latches connecting the highest tube with the one underneath, are part of the respective inserts.

The telescopic arrangement is deployed by application of hydraulic or pneumatic pressure which spreads the telescoping tubes apart, whereupon the latches engage and hold the erected set of tubes mechanically. The pressure can now be relieved. For collapse, the uppermost unlatch means is pulled down, being e.g. spring biased to assume normally a position above the highest latches. As the highest latches are unlocked in that fashion, the uppermost tube telescopes into the one underneath, and the unlatch cone on the insert at the bottom of the highest tube unlatches the latch between the second highest tube, and the third one down from the top etc., until all latches are unlatched and the tube assembly is, in fact, collapsed.

It can readily be seen that this assembly does not depend on hydraulics or pneumatics for maintaining its set up and deployed state; pressure fluid is needed only for deployment and erection. On the other hand, the device is much simpler than conventional, mechanically erected masts. The top-most mast may, e.g. be openable to become accessible, e.g. in the case of hydraulic failure. In this case, one pulls the tubes up by a rope or the like, and they will latch just as described.

DESCRIPTION OF THE DRAWINGS

While the specification concludes with claims particularly pointing out and distinctly claiming the subject matter which is regarded as the invention, it is believed that the invention, the objects and features of the invention and further objects, features and advantages thereof will be better understood from the following description taken in connection with the accompanying drawings in which:

FIG. 1 illustrates the telescoped portions of a deployed mast in accordance with the preferred embodiment of the invention; the drawing has been split and the left-hand portion (FIG. 1a) shows two telescoping tubes unlocked, in the right-hand portions (FIG. 1b), they are locked or latched; and FIG. 2, also drawn in two parts 2a, 2b, respectively, for illustrating the unlocked and locked state of the upper most telescopic tube and the one underneath of the same mast.

Proceeding now to the detailed description of the drawings, the figures show an equipment carrier (antenna mast) which has an overall configuration of a telescoped piston-cylinder arrangement. The telescoped parts are three tubes 1, 2 and 3, more could be provided if needed. The uppermost tube 3 is the equipment carrier proper and the lower tube 1 is connected in some fashion to a base, vehicle or the like, and is connected to a hydraulic control and pressurized fluid supply equipment including, e.g. a pump etc. The tube 2 is the middle extension for this particular mast to establish adequate height but permitting collapse of the mast to a small size sufficient for the purpose of locating and positioning the mast in different places.

Each of the two telescopic tubes 2 and 3 has an insert 4 in its respective lower or bottom portion provided with two or more latches 5. Each insert 4 is a self-contained unit and is put in place in each instant as a whole. Locking elements 6 hold the inserts in place securely, right at the bottom of the respective tube. The two inserts shown in the two figures are affixed to the tubes 2 (FIG. 1) and 3 (FIG. 2), accordingly.

Each latch 5 is constructed as a two arm angle lever and can be pivoted about an axis or shaft 7. An arm 8 of each lever serves as latch lock proper while the other arm 9 is constructed for unlocking or unlatching.

The unlatch arms 9 of all levers 5 in an insert are held in position by a common ring or annular spring member 10 to spread (pivot) the lever arms 8 radially outwardly. These lower latch arms 8 project from underneath the respective telescope tube and in the latch position engage a recess 12 in the respective upper part of the tube underneath; i.e. the latch arms 8 on insert 4 in the bottom of tube 2 rests in recesses 12 of tube 1 (FIG. 1b), and the uppermost tube 3 can be latched at its bottom to tube 2 in similar recesses 12 thereof (FIG. 2b).

FIG. 2, right-hand portion, is used to show a modified latch 5'. The latch arm 8 in this case is directly biased into the latch position by means of a spring 11. In either case, the springs 10 or 11 bias the latches to assume a latching position.

The lower part of each insert 4 is constructed as a short tube 13 with conical outer contour. This member 13 serves as an unlatch means or control cam for the latches 5 on the respective insert underneath for purposes of unlatching them; the cone 13 in each instance pivots the unlatch arms 9 to remove latch arm 8 from the respective recess 12.

It should be noted that the unlatch cone on insert 4 at the bottom of tube 2 is not needed if the tube 1 is the lowest tube not to be unlatched from anything. However, an unlatch function may be desirable here for other reasons. Moreover, FIG. 1 can readily be interpreted as just showing the structure between any two telescoped tubes of a larger number.

The upper telescope element 3 holds, in addition to its bottom near insert 4, a control member 14, being an additional unlatch means to unlock those latches 5, which lock the highest tube 3, to the one next underneath, being tube 2 in this instance. Member 14 is also of conical configuration to provide similar cam action and is maintained in its normal (retracted) position by means of springs 15, permitting the arms 8 of insert 4 in the bottom of top tube 3 to latch. The member 14 has a shoulder 17 which may engage a stop ring 18 when coil spring or springs 15 are permitted to decompress for lifting member 14. A rope 16 traverses all telescoped parts 1, 2, 3 to control (pull down) member 14 whereupon the cone of member 14 unlatches the latches 5 which connect part 3 to part 2.

The mast is erected, set up and deployed by pressurizing the interior of the tubes 1, 2, 3. Uppermost tube or part 3 moves first, i.e. up and out of tube 2, until the latches 5, arms 8 of tube 3 engage the recesses 12 of tube 2. Since rope 16 is not pulled, springs 15 hold the latch control member 14 in up and disengaged position as shown in the right-hand part of FIG. 2a. After parts 2 and 3 are latched, they move up together in tube 1, until the latches 5 of insert member 4 in part 2 have their arms 8 engage the recesses 12 in the upper part of tube 1 (FIG. 1b). The cone in the upper right portion of FIG. 1b pertains to the insert on tube 3, and is actually not visible in the fully erected tube assembly.

Following latching, one has obtained maximum deployment height, and the hydraulics or pneumatics may depressurize or vent the interior of the tubes 1, 2, 3. The deployed position of the mast is maintained by the mechanical latching.

For retracting and collapsing the mast, one simply pulls rope 16 which moves member 14 down so that the latch between parts 3 and 2 is unlatched. This is shown in the left-hand portion of FIG. 2b. The bottom of insert 4 on tube 3 is a cone 13 which, as part 3 telescopes down into tube 2, will soon engage the unlatch arms 9 on the insert 4 in the bottom of tube 2, and that unlatches the connection between tubes 1 and 2. The upper cone 13 in FIG. 1a pertains to the insert in the bottom of tube 3 and has just unlatched the latches 5 which held tubes 1 and 2 together. The cone 13 of insert 4 in the bottom of tube 2 (lower portion of FIG. 1) fulfills other control functions in the bottom of tube 1 when all parts are telescoped into each other.

It can readily be seen that this assembly is not limited to three telescopic tubes but more can be used whereby they are all deployed upon pressurization in sequence and latch. They all unlatch each other in the same sequence as described.

It can further be seen that the geometric dimensions of the deployed mast does not depend on the temperature of any hydraulic or pneumatic fluid nor on the integrety of such pressure devices. The pressurized fluid is used only for original deployment. On the other hand, the structure which locks or latches the parts together does latch them automatically and is unlatched in a very simple cascaded-like fashion. Since the interior of the telescopic tubes is at times pressurized, it is sealed off so that the latch mechanics is, in fact, protected against ambient weather conditions. A suitable feed-through mechanism must be provided for the rope 16 in the interior of the tube assembly.

The invention is not limited to the embodiments described above but all changes and modifications thereof not constituting departures from the spirit and scope of the invention are intended to be included.

I claim:

1. Mast-like equipment carrier constructed from a plurality of telescoped tubes, in which the upper one is closed to permit pressurization of the interior of the tubes, there being pressure means to pressurize the interior of the tubes to extend the telescoping arrangement and set up the mast, the improvement comprising:

an insert for each of those of said tubes above the lowest one, the respective insert being disposed at the bottom of the respective tube, each one of said inserts including at least one spring-biased latch, having a latch arm engaging a recess in the respective next-lower one of said telescoped tubes;

conical unlatch means on at least the insert or inserts on those of said tubes above the second-lowest one, to engage the spring-biased latch on the respective insert underneath, for unlatching the latch; and further conical unlatch means normally disengaged from, but operable to engage the spring-biased latch on the insert of the highest one of the tubes for unlatching the latter latch.

2. The improvement as in claim 1, wherein each latch is a two arm, angle lever, one arm being provided for latching in the respective one of the recesses, the other arm being provided for engagement by the respective conical unlatch means when lowered from above, said lever being spring biased into the latching position.

3. The improvement as in claim 1 or 2, said further unlatch means being spring biased and lowered by means of a rope to unlatch the latch on the highest insert, whereupon the unlatch means on the latter and lower inserts move down in sequence to unlatch the respective next lower latches.

4. The improvement as in claim 1, there being more than one latch per insert, but being biased by a common annular spring.

5. The improvement as in claim 1, said latches being individually biased by coil springs.

6. The improvement as in claim 1, wherein said latches are pivoted on the respective insert, underneath of which extends a cone as the unlatch means.

* * * * *